United States Patent
Kameno

(10) Patent No.: US 9,802,175 B2
(45) Date of Patent: Oct. 31, 2017

(54) METHOD OF PRODUCING HOLLOW PARTICLES, METHOD OF PRODUCING ANTIREFLECTION COATING, AND METHOD OF PRODUCING OPTICAL ELEMENT

(71) Applicant: CANON KABUSHIKI KAISHA, Tokyo (JP)

(72) Inventor: Yu Kameno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 14/388,380

(22) PCT Filed: Feb. 26, 2013

(86) PCT No.: PCT/JP2013/001114
§ 371 (c)(1),
(2) Date: Sep. 26, 2014

(87) PCT Pub. No.: WO2013/145548
PCT Pub. Date: Oct. 3, 2013

(65) Prior Publication Data
US 2015/0056371 A1    Feb. 26, 2015

(30) Foreign Application Priority Data

Mar. 26, 2012    (JP) ................. 2012-069662

(51) Int. Cl.
*B01J 13/20*    (2006.01)
*C09D 5/00*    (2006.01)
(Continued)

(52) U.S. Cl.
CPC ............... *B01J 13/20* (2013.01); *B01J 13/18* (2013.01); *B01J 13/203* (2013.01); *C09D 5/006* (2013.01);
(Continued)

(58) Field of Classification Search
CPC .......... B01J 13/18; B01J 13/20; B01J 13/203; G02B 1/111; G02B 1/113; C09D 5/006
(Continued)

(56) References Cited

U.S. PATENT DOCUMENTS

2007/0036705 A1    2/2007 Butts
2009/0004418 A1    1/2009 Takaki
(Continued)

FOREIGN PATENT DOCUMENTS

CN    101282907 A    10/2008
CN    102046522 A    5/2011
(Continued)

OTHER PUBLICATIONS

Office transaltion of JP 2008-201908, Muaki et al, dated Sep. 2008.*
(Continued)

*Primary Examiner* — Frances Tischler
(74) *Attorney, Agent, or Firm* — Canon U.S.A.Inc., IP Division

(57) ABSTRACT

The present invention provides a method of producing hollow particles for reducing light scattering in an antireflection coating. This method includes synthesizing core-shell particles including a core containing an organic compound as a major component and a shell containing an inorganic-based compound as a major component in an aqueous medium, dispersing the core-shell particles in an organic solvent, and preparing hollow particles by heating the core-shell particles dispersed in the organic solvent to remove the core therefrom.

8 Claims, 1 Drawing Sheet

(51) Int. Cl.
    *G02B 1/111* (2015.01)
    *G02B 1/118* (2015.01)
    *B01J 13/18* (2006.01)
    *G02B 1/113* (2015.01)
(52) U.S. Cl.
    CPC .............. *G02B 1/111* (2013.01); *G02B 1/113* (2013.01); *G02B 1/118* (2013.01)
(58) Field of Classification Search
    USPC .................. 521/61; 106/287.1, 481, 490
    See application file for complete search history.

(56) References Cited

U.S. PATENT DOCUMENTS

2010/0204342 A1    8/2010  Kawasaki
2011/0197787 A1*   8/2011  Kawai .................... B82Y 30/00
                                                            106/287.1

FOREIGN PATENT DOCUMENTS

| CN | 102196996 A | 9/2011 |
| EP | 2351707 A1 | 8/2011 |
| EP | 2386590 A1 | 11/2011 |
| JP | 4046921 B2 | 2/2008 |
| JP | 2008-201908 | * 9/2008 |
| JP | 2009-234848 A | 10/2009 |

OTHER PUBLICATIONS

Tissot et al., "SiOH-Functionalized Polystyrene Latexes. A Step toward the Synthesis of Hollow Silica Nanoparticles", Chemistry of Materials, American Chemical Society, (2002), pp. 1325-1331, vol. 14 No. 3.

* cited by examiner

[Fig. 1]
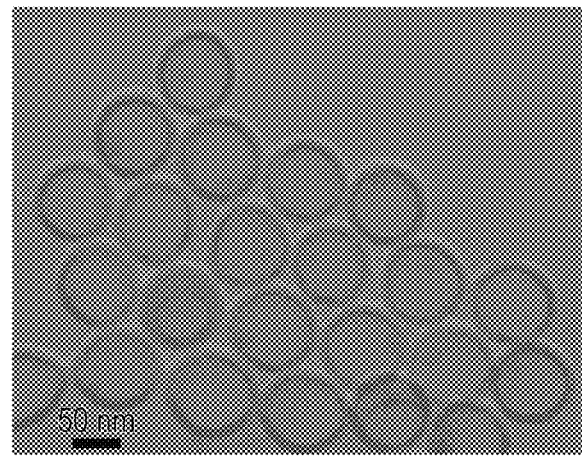
[Fig. 2]
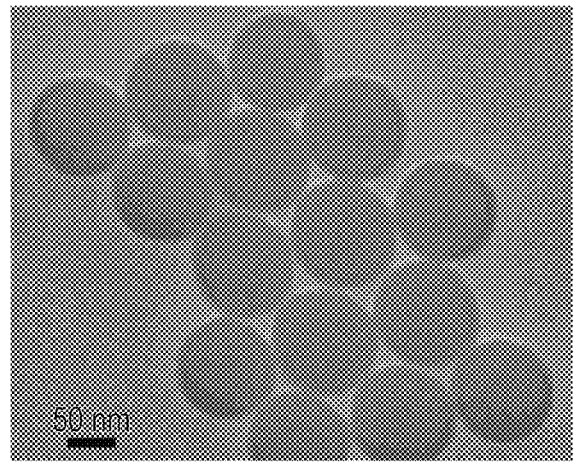

METHOD OF PRODUCING HOLLOW PARTICLES, METHOD OF PRODUCING ANTIREFLECTION COATING, AND METHOD OF PRODUCING OPTICAL ELEMENT

TECHNICAL FIELD

The present invention relates to methods of producing hollow particles with low refractive indices. The present invention also relates to methods of producing antireflection coatings and methods of producing optical elements.

BACKGROUND ART

There are commonly known methods for reducing light reflection on the surface of an optical element by forming a film of a material with a low refractive index, i.e., a low-refractive-index film, on the surface of the optical element. A typical method is dry deposition, in which a low-refractive-index material is deposited in a vacuum by, for example, sputtering or evaporation. Another method is wet deposition, in which low-refractive-index particles are synthesized in a liquid phase, are mixed with a coating solution, and are deposited by, for example, dip coating or spin coating. The latter method is more advantageous in terms of the cost of deposition per low-refractive-index film, and many reports have been available.

An example of low-refractive-index particles for use in wet deposition is hollow particles such as hollow silica particles. There are reports on methods of producing hollow particles by preparing core-shell particles and removing the core therefrom. For example, PTL 1 discloses a method including forming inorganic particles such as aluminum oxide or calcium carbonate particles as a core, synthesizing silica on the core to prepare core-shell particles, and removing the core therefrom by ionization. PTL 2 discloses a method including forming organic polymer particles as a core, synthesizing silica on the core to prepare core-shell particles, and removing the core therefrom by baking.

CITATION LIST

Patent Literature

PTL 1: Japanese Patent No. 4046921
PTL 2: Japanese Patent Laid-Open No. 2009-234848

SUMMARY OF INVENTION

The present invention provides a method of producing hollow particles by forming a shell on core particles formed of an organic compound to prepare core-shell particles and removing the core therefrom with little or no aggregation. The present invention also provides a method of producing an antireflection coating including applying the hollow particles produced by the above method and a method of producing an optical element including forming the antireflection coating on a surface of an optical member.

According to an aspect of the present invention, there is provided a method of producing hollow particles. This method includes synthesizing core-shell particles including a core containing an organic compound as a major component and a shell containing an inorganic-based compound as a major component in an aqueous medium, dispersing the core-shell particles in an organic solvent, and preparing hollow particles by heating the core-shell particles dispersed in the organic solvent to remove the core therefrom.

According to another aspect of the present invention, there is provided a method of producing an antireflection coating. This method includes producing hollow particles by the method described above and forming an antireflection coating by applying the hollow particles.

According to another aspect of the present invention, there is provided a method of producing an optical element. This method includes producing hollow particles by the method described above and producing an optical element by applying the hollow particles.

By the method described above, a hollow silica particle dispersion can be produced with little or no aggregation.

The hollow silica particles produced by the method described above can be applied to form an antireflection coating with a low refractive index and reduced light scattering.

Further features of the present invention will become apparent from the following description of exemplary embodiments with reference to the attached drawings.

BRIEF DESCRIPTION OF DRAWINGS

FIG. 1 is a transmission electron micrograph of hollow particles obtained in Example 1.

FIG. 2 is a transmission electron micrograph of core-shell particles obtained in Comparative Example 6.

DESCRIPTION OF EMBODIMENTS

Embodiments of the present invention will now be described.

An embodiment of the present invention relates to a method of producing hollow particles that can reduce light scattering.

The method of producing hollow particles according to this embodiment includes synthesizing core-shell particles including a core containing an organic compound as a major component and a shell containing an inorganic-based compound as a major component in an aqueous medium, dispersing the core-shell particles in an organic solvent, and preparing hollow particles by heating the core-shell particles dispersed in the organic solvent to remove the core therefrom. As used herein, the term "core-shell particles" refers to particles including a core (inner core) and a shell (outer shell) having different compositions.

According to this embodiment, the method of producing hollow particles includes a first step of synthesizing core particles from an organic compound in an aqueous medium, a second step of synthesizing core-shell particles by forming a shell on the core particles, a third step of dispersing the core-shell particles in an organic solvent, and a fourth step of removing the core by heating in a sealed container. According to another embodiment of the present invention, a method of producing an antireflection coating includes a fifth step, after the first to fourth steps, of forming an antireflection coating by applying the hollow particles. The first to fifth steps will now be described in detail.

First Step (Step of Synthesizing Core Particles)

In the first step, core particles are synthesized from an organic compound in an aqueous medium. The core particles can be synthesized by polymerizing a monomer in an aqueous medium.

The core particles can be synthesized by emulsion polymerization, which forms latex particles with a relatively uniform particle size. Examples of monomers used for emulsion polymerization include styrene monomers, acrylic acid ester monomers, and vinyl acetate monomers. For high stability in the aqueous medium, a styrene monomer, which contains no oxygen atom, can be used. Examples of surfactants used for emulsion polymerization include water-soluble cationic surfactants such as tetraalkylammonium salts. Examples of polymerization initiators include water-soluble polymerization initiators. If a cationic surfactant is used, a water-soluble polymerization initiator of the same type, i.e., a cationic polymerization initiator, can be used so that the reaction proceeds stably.

The core particles can have a number average particle size of 10 to 200 nm. If the core particles have a number average particle size of less than 10 nm, they tend to exhibit large variations from the number average particle size. If the core particles have a number average particle size of more than 200 nm, they tend to cause light scattering in the antireflection coating formed in the fifth step and thus result in decreased performance when used for an optical element. Preferably, the core particles have a number average particle size of 10 to 50 nm. The core particles can be monodisperse particles having a polydispersity index of 0.200 or less.

The particle size herein is calculated as follows. A transmission electron micrograph of the particles is captured. At least 30 particles in the micrograph are randomly selected. The particle sizes of the particles are measured as the maximum chord length in the horizontal direction, and the number average particle size thereof is calculated. The polydispersity index is determined by cumulant analysis of an auto-correlation function obtained from changes in scattering intensity over time in particle size distribution analysis using a dynamic light scattering apparatus. If the particles have a polydispersity index of more than 0.200, they tend to cause light scattering in the antireflection coating formed in the fifth step because of their large particle size variations and thus result in decreased performance when used for an optical element.

Second Step (Step of Synthesizing Core-Shell Particles)

In the second step, core-shell particles are synthesized by forming a shell on the core particles synthesized in the first step in an aqueous medium. The shell can contain an inorganic-based compound as a major component. The term "major component of the shell" refers to a component contained in the shell in an amount of 51% by mass or more. The content of the inorganic-based compound in the shell is preferably 80% by mass or more, more preferably 90% by mass or more. As used herein, the term "inorganic-based compound" refers to inorganic compounds and compounds containing an inorganic component. Examples of compounds containing an inorganic component include organic-inorganic hybrid materials. An example of an inorganic compound is silica. An example of an inorganic-based compound is a siloxane. An example of a siloxane is polysiloxane.

For example, the shell is formed on the core particles by synthesizing a siloxane from a silane in an aqueous medium. The term "aqueous medium" refers to a medium containing at least 50% by mass of water. The content of water in the aqueous medium is preferably 80% to 100% by mass, more preferably 90% to 100% by mass.

The shell can be formed of a material represented by the formula $R_ySiO_z$, (where R is a hydrocarbon group, y is greater than or equal to 0 and is less than or equal to 1, and z is greater than or equal to 1 and is less than or equal to 2).

The $R_ySiO_z$ component can be synthesized using a silicon alkoxide as a silane by hydrolyzing the silicon alkoxide and condensing the resulting silanol. Examples of silicon alkoxides include tetraalkoxysilanes such as tetramethoxysilane and tetraethoxysilane, alkyltrialkoxysilanes such as methyltrimethoxysilane and methyltriethoxysilane, and mixtures thereof. For ease of reactivity control, an alkyltrialkoxysilane can be used. To inhibit aggregation of the shell due to crosslinking, an alkyltrialkoxysilane can be hydrolyzed in a weakly basic aqueous solution at a temperature of 40 degrees (Celsius) or lower.

The shell is determined to be formed on the core by transmission electron microscopy. The core and the shell can be distinguished by the contrast therebetween because an organic material generally has a higher electron beam transmittance than an inorganic material and thus provides a high contrast. If elemental analysis is performed during transmission electron microscopy, the constituents of the shell can also be determined by detecting components such as silicon and oxygen.

The core-shell particles, which are larger than the core particles, can have a number average particle size of 200 nm or less. If the core-shell particles have a number average particle size of more than 200 nm, they tend to cause light scattering in the antireflection coating formed in the fifth step and thus result in decreased performance when used for an optical element.

Third Step (Step of Dispersing Core-Shell Particles in Solvent)

In the third step, the core-shell particles synthesized in the second step are dispersed in a solvent. The solvent can be an organic solvent. The aqueous solvent (aqueous medium) exhibits high oxidizing power and thus facilitates decomposition of the shell during heating in a sealed container in the fourth step, described later. Accordingly, the organic solvent can be one having no oxygen atom in the molecule thereof and immiscible in water. Examples of organic solvents include benzene, xylene, toluene, cumene, styrene, n-hexane, cyclohexane, isohexane, n-heptane, isoheptane, n-octane, isooctane, methylene chloride, chloroform, ethylene chloride, trichloroethane, trichloroethylene, and paraffinic solvents. For example, the organic solvent can be n-heptane, isoheptane, n-octane, or isooctane.

To disperse the core-shell particles synthesized in the second step in the organic solvent, the core-shell particles can be reacted with a hydrophobic material. Examples of hydrophobic materials include silane coupling agents and silylating agents. After the reaction, the aqueous medium can be separated.

Fourth Step (Step of Removing Core by Heating)

In the fourth step, hollow particles are prepared by heating the core-shell particles dispersed in the organic solvent to remove the core therefrom. The core can be removed from the core-shell particles by sealing and heating a container containing the organic solvent. If the container is heated without being sealed, the organic solvent evaporates, and the core-shell particles or hollow particles aggregate after drying, which results in increased light scattering in the antireflection coating formed in the fifth step.

In the fourth step, the core-shell particles can be heated in the sealed container at a temperature of 350 to 500 degrees (Celsius) and a pressure of 4.0 to 30 MPa. If the temperature or pressure is lower than the above range, the core might not be removed. If the temperature or pressure is higher than the above range, the organic solvent might decompose and react with the hollow particles. It can be determined that the core component has been removed by comparing spectra obtained by Fourier transform infrared spectroscopy after cleaning the particles before and after the fourth step. If the core component has been removed, no absorption peak characteristic of the core component is detected. The hollow particles can be monodisperse particles having a polydispersity index of 0.200 or less.

Fifth Step (Step of Forming Antireflection Coating)

An antireflection coating with a low refractive index can be formed by applying the hollow particles synthesized in the fourth step to a substrate to form a rough surface on the substrate. If the hollow particles is applied using a volatile organic solvent, the resulting antireflection coating is composed only of hollow silica particles surrounded by air, thus having a significantly low refractive index. For improved strength, a low-refractive-index solvent such as a sol-gel solution that forms a silica backbone can be used. The hollow particles synthesized by the method according to this embodiment can be dispersed in such a solvent and be applied to form an antireflection coating with further improved strength.

The hollow particles can be applied by solution coating, such as spin coating, bar coating, or dip coating, which is a simple and low-cost process. Alternatively, the hollow particles synthesized by the method according to this embodiment can be deposited by a process such as sputtering or evaporation and be used as an antireflection coating.

The substrate can be a plastic or glass substrate. The antireflection coating can be formed on a transparent substrate such as a plastic or glass substrate to produce an optical element with a significantly low surface reflectance.

EXAMPLES

The present invention is illustrated by the following non-limiting examples.

Example 1

(First Step)

In this step, polystyrene core particles were synthesized from styrene by the following procedure. In a 240 mL separable flask were placed 235 g of water and 5 g of a 0.01 g/mL cetyltrimethylammonium bromide aqueous solution (hereinafter "CTAB"). The flask was filled with nitrogen gas. The solution was heated to a temperature of 80 degrees (Celsius) in a nitrogen gas atmosphere. After heating, 2 mL of styrene was added, and the solution was stirred for 5 minutes. As a water-soluble polymerization initiator, 1 mL of a 0.1 g/mL 2,2'-azobis(2-amidinopropane) hydrochloride aqueous solution (hereinafter "AIBA") was added, and the solution was stirred for 4 hours to obtain a dispersion of polystyrene core particles having a number average particle size of 82 nm. The polystyrene core particles had a monodisperse particle size distribution with a polydispersity index of 0.006.

(Second Step)

To 14 mL of the polystyrene core particle dispersion obtained in the first step were added 10 mL of water, 1.5 mL of 0.01 g/mL L(+)-lysine, 10 mL of n-octane, and 1.24 mL of triethoxymethylsilane. The dispersion was stirred for 16 hours to obtain an aqueous dispersion of core-shell particles including a polysiloxane shell and having a number average particle size of 103 nm. The core-shell particles had a monodisperse particle size distribution with a polydispersity index of 0.019.

(Third Step)

To 10 mL of the aqueous dispersion of the core-shell particles obtained in the second step, which had a number average particle size of 103 nm, were added 10 mL of n-octane and 1 mL of n-octyldimethylsilyl chloride. The dispersion was stirred at 800 rpm for 2 hours to obtain a dispersion of the core-shell particles in n-octane.

(Fourth Step)

In a 50 mL container was sealed 25 mL of the core-shell particle dispersion. The dispersion was heated at a temperature of 400 degrees (Celsius) and a pressure of 6.8 MPa with stirring at 400 rpm for 1 hour. After heating, the dispersion was dried and examined under a transmission electron microscope. As a result, polysiloxane hollow particles having a number average particle size of 103 nm were observed. FIG. 1 shows a transmission electron image of the hollow particles.

The polydispersity index of the particles in the dispersion was measured to be 0.023. The particles before and after the fourth step were cleaned and dried on a silicon wafer and were analyzed by Fourier transform infrared spectroscopy. Whereas the particles before the fourth step showed both a peak due to carbon-carbon double bonds in polystyrene and peaks due to silicon-carbon bonds and silicon-oxygen bonds in polysiloxane, the particles after the fourth step showed peaks due to the bonds in polysiloxane and no peak due to the bonds in polystyrene.

Example 2

(First Step)

The procedure in Example 1 was repeated except that 1 mL of AIBA was replaced by 6 mL of AIBA to obtain a dispersion of polystyrene core particles having a number average particle size of 30 nm. The polystyrene core particles had a monodisperse particle size distribution with a polydispersity index of 0.009.

(Second Step)

The procedure in Example 1 was repeated. The resulting core-shell particles had a particle size of 38 nm and a polydispersity index of 0.023.

(Third Step)

The procedure in Example 1 was repeated.

(Fourth Step)

In a container was sealed 5 mL of the core-shell particle octane dispersion and 20 mL of octane. The dispersion was heated at 400 degrees (Celsius) with stirring at 400 rpm for 2 hour. After cooling, the dispersion was dried and examined under a transmission electron microscope. As a result, hollow particles having a particle size of 38 nm were observed. Thus, a hollow particle dispersion was obtained.

The polydispersity index of the particles in the dispersion was measured to be 0.026. In Fourier transform infrared spectroscopy, the particles after the fourth step showed peaks due to polysiloxane and no detectable peak due to polystyrene.

Example 3

(First to Fourth Steps)

The procedure in Example 2 was repeated.

(Fifth Step)

The solvent in the resulting hollow particle dispersion was replaced by a silica sol-gel solution (ELCOM CN-1013 from JGC Catalysts and Chemicals Ltd.). The dispersion was applied to a thickness of 110 nm on BK-7 glass by spin coating. The refractive index of the resulting antireflection coating measured using a spectral ellipsometer (VASE from J.A. Woollam Co., Inc.) was 1.26. The reflectance measured at a wavelength of 589 nm using a spectrophotometer (U-4000 from Hitachi High-Tech Fielding Corporation) was 0.05%. These results demonstrate that the antireflection coating can be used for an optical element.

Next, scattering was evaluated as follows. A substrate holder was set such that the BK-7 glass remains at the same position. The substrate holder was equipped with an illuminometer (T-10M from Konica Minolta Sensing, Inc.). The substrate holder was illuminated with white light on the substrate side while measuring the illuminance so that the illuminance was 4,000 lux in the perpendicular direction. The substrate having the antireflection coating of Example 3 was set such that the coating on the substrate was on the side illuminated with white light. The substrate was tilted at 45 degrees. An image of the substrate was captured using a camera (EOS-7D with an EF 50 mm F2.5 Compact Macro lens from CANON KABUSHIKI KAISHA) on the side opposite the illuminated side in the normal direction. The camera capturing conditions were as follows: the ISO was 400, the white balance setting was daylight, the f-stop was 20, and the shutter speed was 10 seconds. Scattering was evaluated as the average luminance measured in four areas 700 pixels by 700 pixels in size on the substrate in the captured image (hereinafter "scattering value). The scattering value was 12.5. The results demonstrate that the antireflection coating had a significantly lower scattering value than an antireflection coating of Comparative Example 6, which was formed by applying particles heated in air.

Comparative Example 1

(First and Second Steps)
The procedure in Example 1 was repeated.
(Third Step)
The third step was not performed.
(Fourth Step)
The resulting core-shell particle dispersion was dried in air under 0.1 MPa and was heated to a temperature of 500 degrees (Celsius) under the atmospheric pressure to remove the polystyrene forming the core particles. The resulting particles were examined under a transmission electron microscope (HD2300 from Hitachi High-Technologies Corporation). As a result, polysiloxane hollow particles were observed in the transmission electron image. The dried and heated hollow particles were not dispersed but remained aggregated when mixed in water.

Comparative Example 2

(First and Second Steps)
The procedure in Example 1 was repeated.
The resulting polystyrene particles had a number average particle size of 30 nm. The resulting core-shell particles had a number average particle size of 38 nm
(Third Step)
The third step was not performed.
(Fourth Step)
The procedure in Comparative Example 1 was repeated to remove the polystyrene forming the core particles. Although hollow particles were obtained in Comparative Example 2, they were not dispersed but remained aggregated when mixed in water.

Comparative Example 3

(First and Second Steps)
The procedure in Comparative Example 1 was repeated except that the stirring time in the second step was 120 hours. The resulting polystyrene particles had a number average particle size of 82 nm. The resulting core-shell particles had a number average particle size of 180 nm.
(Third Step)
The third step was not performed.
(Fourth Step)
In a 50 mL container was sealed 25 mL of the core-shell particle dispersion. The dispersion was heated at a temperature of 380 degrees (Celsius) and a pressure of 23 MPa with stirring at 400 rpm for 1 hour. After cooling, the dispersion was dried and examined under a transmission electron microscope. As a result, no particles were observed.

Comparative Example 4

(First and Second Steps)
The procedure in Comparative Example 3 was repeated. The resulting polystyrene particles had a number average particle size of 82 nm. The resulting core-shell particles had a number average particle size of 180 nm.
(Third Step)
The third step was not performed.
(Fourth Step)
The procedure in Comparative Example 3 was repeated except that the heating temperature was 150 degrees (Celsius), the pressure was 0.4 MPa, and the heating time was 2 hours. After cooling, the dispersion was dried and examined under a transmission electron microscope. As a result, core-shell particles having a particle size of 115 nm were observed. The polystyrene core particles remained, and only the shell became thinner Thus, no hollow particles were obtained.

Comparative Example 5

(First and Second Steps)
The procedure in Comparative Example 3 was repeated. The resulting dispersion contained core-shell particles having a number average particle size of 180 nm.
(Third Step)
The third step was not performed.
(Fourth Step)
The procedure in Comparative Example 3 was repeated except that the heating temperature was 100 degrees (Celsius), the pressure was 0.2 MPa, and the heating time was 2 hours. After cooling, the dispersion was dried and examined under a transmission electron microscope. As a result, core-shell particles having a particle size of 180 nm were observed. Thus, no hollow particles were obtained.

Comparative Example 6

(First and Second Steps)
The procedure in Example 1 was repeated. The resulting polystyrene particles had a number average particle size of 82 nm. The resulting core-shell particles had a number average particle size of 103 nm.
(Third Step)
To 10 mL of the core-shell particle aqueous dispersion obtained in the second step were added 10 mL of octane and 1 mL of n-octyldimethylsilyl chloride. The dispersion was stirred at 800 rpm for 2 hours to obtain a dispersion of the core-shell particles in octane.
(Fourth Step)
In a container was sealed 5 mL of the core-shell particle octane dispersion and 20 mL of octane. The dispersion was heated at a temperature of 300 degrees (Celsius) and a pressure of 3.0 MPa with stirring at 400 rpm for 2 hours.

After cooling, the dispersion was dried and examined under a transmission electron microscope. As a result, core-shell particles having a particle size of 103 nm were observed. Thus, no hollow particles were obtained. FIG. 2 shows a transmission electron image of the particles. The core in the particles shown in FIG. 2 had a lower transmitted light intensity and therefore a lower contrast to the shell than the core in the hollow particles of Example 1. Elemental analysis of the particles in the examination image detected silicon and oxygen.

Comparative Example 7

(First to Fourth Steps)
The procedure in Comparative Example 2 was repeated.
(Fifth Step)
The resulting aggregated hollow particles were added to a silica sol-gel solution (ELCOM CN-1013 from JGC Catalysts and Chemicals Ltd.) and were applied to BK-7 glass by spin coating.

Scattering was evaluated by the same procedure in Example 3. The scattering value was 160.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-069662, filed Mar. 26, 2012, which is hereby incorporated by reference herein in its entirety.

INDUSTRIAL APPLICABILITY

Hollow particles produced by a method according to an embodiment of the present invention are suitable for devices that do not require light reflected by an interface with air, including optical elements mounted on imaging devices such as cameras and camcorders and projecting devices such as liquid crystal projectors and optical scanners for electrophotographic devices.

The invention claimed is:
1. A method of producing hollow particles, comprising:
    synthesizing core-shell particles comprising a core containing 51% by mass or more of an organic compound and a shell containing 51% by mass or more of an inorganic-based compound in an aqueous medium;
    after the synthesizing, reacting the core-shell particles with a silane coupling agent or a silylating agent before being heated;
    dispersing the core-shell particles in an organic solvent; and
    after the dispersing, preparing hollow particles by heating the core-shell particles dispersed in the organic solvent to remove the core therefrom,
    wherein the core-shell particles are heated in a sealed container in the preparation of the hollow particles, and
    wherein the core-shell particles are heated at a temperature of 350 to 500 degrees (Celsius) and a pressure of 4.0 to 30 MPa so as to produce the hollow particles by removing cores from the core-shell particles.

2. The method of producing hollow particles according to claim 1, wherein the inorganic-based compound contained in the core-shell particles heated in the preparation of the hollow particles is $R_y SiO_z$, wherein R is a hydrocarbon group, y is greater than or equal to 0 and is less than or equal to 1, and z is greater than or equal to 1 and is less than or equal to 2.

3. The method of producing hollow particles according to claim 1, wherein the core-shell particles heated in the preparation of the hollow particles have a particle size of 10 to 200 nm.

4. The method of producing hollow particles according to claim 1, wherein the inorganic-based compound is a siloxane.

5. The method of producing hollow particles according to claim 1, wherein the hollow particles have a polydispersity index of 0.200 or less.

6. The method of producing hollow particles according to claim 1, wherein the organic solvent contains no oxygen atom in a molecule thereof and is hydrophobic.

7. The method of producing hollow particles according to claim 1, wherein the organic solvent is any of benzene, xylene, toluene, cumene, styrene, n-hexane, cyclohexane, isohexane, n-heptane, isoheptane, n-octane, isooctane, methylene chloride, chloroform, ethylene chloride, trichloroethane, trichloroethylene, and paraffinic solvents.

8. The method of producing hollow particles according to claim 1, wherein the organic solvent is any of n-heptane, isoheptane, n-octane, and isooctane.

* * * * *